United States Patent [19]
Cederwall et al.

[11] Patent Number: 5,545,010
[45] Date of Patent: Aug. 13, 1996

[54] METHOD AND APPARATUS FOR TRIM BALANCING A GAS TURBINE ENGINE

[75] Inventors: Philip J. Cederwall; Garrett P. Prins; Vern V. Leuven, all of San Diego, Calif.

[73] Assignee: Solar Turbines Incorporated, San Diego, Calif.

[21] Appl. No.: 60,625

[22] Filed: May 13, 1993

[51] Int. Cl.[6] ........................................... F01D 25/04
[52] U.S. Cl. ................................. 416/145; 415/201
[58] Field of Search ........................... 415/118, 201; 416/144, 145

[56] References Cited

U.S. PATENT DOCUMENTS

| 3,945,760 | 3/1976 | Miller | 415/201 |
|---|---|---|---|
| 4,842,485 | 6/1989 | Barber | 416/144 |

FOREIGN PATENT DOCUMENTS

| 2931193 | 2/1981 | Germany | 416/145 |
|---|---|---|---|
| 2219842 | 12/1989 | United Kingdom | 415/118 |

Primary Examiner—Edward K. Look
Assistant Examiner—Mark Sgantzos
Attorney, Agent, or Firm—Larry G. Cain

[57] ABSTRACT

Trim balancing of rotating components in the past has increased manufacturing cost. In many past applications, the time and energy required to trim balance rotating components required partial disassembly of an outer case or structure member. The present trim balancing system allows the gas turbine engine to be balanced with the outer case in situ. Access to a rotating component from the exterior of the case is made possible by a compressor air flow path and a pair of holes. The balancing can be accomplished by adding or removing weights or plugs to a band assembled on the rotating component.

10 Claims, 3 Drawing Sheets

METHOD AND APPARATUS FOR TRIM BALANCING A GAS TURBINE ENGINE

TECHNICAL FIELD

This invention relates generally to gas turbine engines and more particularly to trim balancing of rotating components which travel at a high rate of speed within the engine in which any out of balance of the rotating components causes increased wear and reduced longevity of the gas turbine.

BACKGROUND ART

During the manufacturing of rotating components used with gas turbine engines, the balance of such components are controlled to a specified tolerance. In most engines, the speed at which components within the engine are balanced is less than the operational speed of the rotating components and location and balance correction is the best practical guess of where the unbalance is occurring. If the balance correction parameters used are not appropriate, the unbalance operation of the rotating components at design and operating speed can cause bending of the rotating components resulting in severe vibration. In many applications, the subassembly is assembled within the gas turbine engine, rotated to a preestablished speed, monitored to confirm an acceptable level of vibration due to unbalance and if that level exceeds a predetermined amount is disassembled from the engine and has the appropriate amount of balance weight properly positioned on the component and secured thereto by welding, bolting or grinding and reassembled.

In other applications, the gas turbine engine structure or outer case is built in segments such as an outer case being formed in halves, thirds or quarters. After the rotating components have been assembled in the gas turbine engine, rotated to a preestablished speed, monitored to determine the out of balance position and amount, a portion of the segments is disassembled from the engine and has the appropriate amount of balance weight properly positioned on the component and secured thereto and the case is reassembled.

The time and expense of such operations is unwanted, costly and inefficient.

The present invention is directed to overcoming one or more of the problems as set forth above.

DISCLOSURE OF THE INVENTION

In one aspect of the invention, a trim balancing system is adapted for use with a mechanism. The mechanism includes an outer case having an opening therein. A rotating component is rotatably positioned within the case. The rotating component has an inlet end portion. The trim balancing system is comprised of means for balancing excessive vibrations caused by the rotating component and means for accessing the balancing means wherein said outer case is in situ.

In another aspect of the invention, a method for trim balancing a rotating component being positioned within an outer case is disclosed. The rotating component includes an annular gallery and a plurality of circumferentially spaced holes defined therein in generally radially aligned relation to the annular gallery and opening thereto. Means for locking operatively associated with the annular gallery and means for accessing the annular gallery with the outer case being in situ. The method of trim balancing comprising the steps of rotating the rotating component, determining the position and amount of imbalance of the rotating component, recording the position and amount of imbalance, bringing the rotating component to a predetermined stopped position relative to the accessing means, accessing the rotating component, positioning at least one of a balance weight in the one of the evenly spaced holes most nearly coinciding with the recorded position.

BEST MODE FOR CARRYING OUT THE INVENTION

Figure 1:
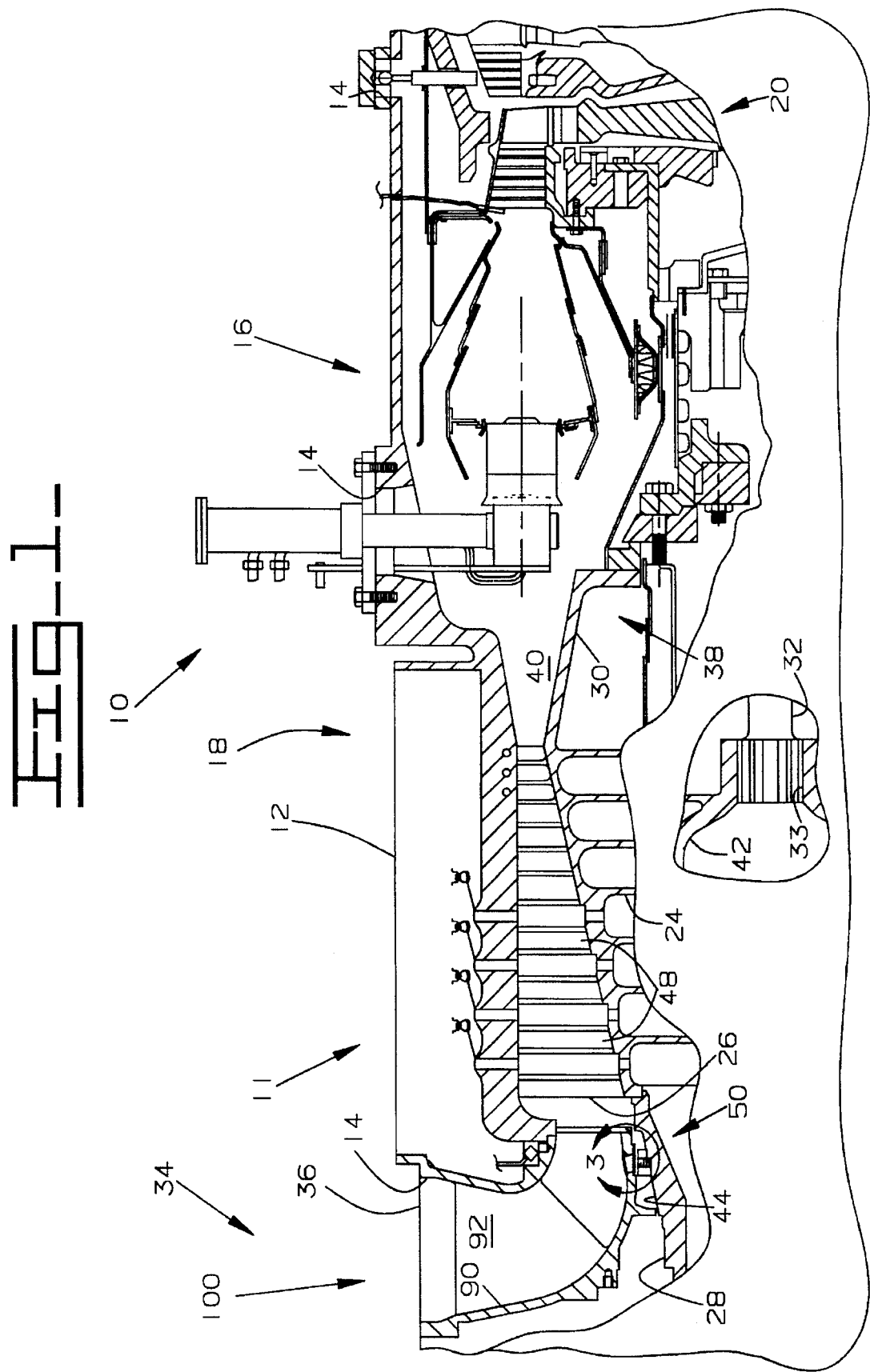
FIG. 1 is a partially sectioned side view of a gas turbine engine embodying the present invention.
Figure 2:
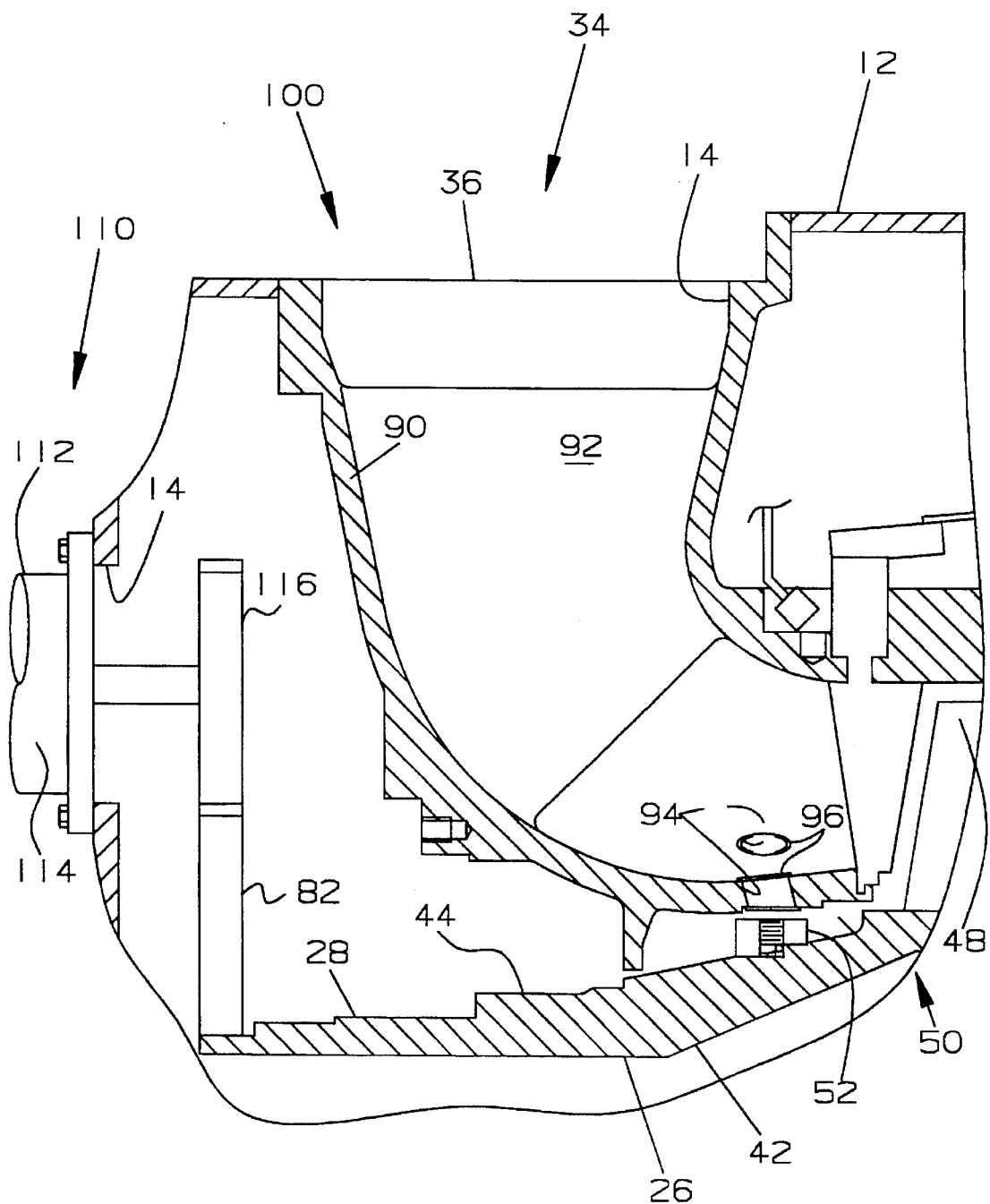
FIG. 2 is an enlarged sectional view of a portion of an intake plenum and a portion of a compressor section embodying the present invention.

Referring to FIG. 1 and FIG. 2, a mechanism which in this application is a gas turbine engine 10 is partially shown and includes a trim balancing system 11. The engine 10 includes an outer stationary case 12 having a plurality of openings 14 therein, a combustor section 16 positioned within the case 12 and a plurality of rotating components positioned within the case 12 such as a compressor section 18 and a turbine section 20. The compressor section includes a rotating component 24 such as a bladed rotor 26 having an inlet end portion 28 and an outlet end portion 30. The turbine section 20 rotatably drives an output shaft, not shown. The turbine section 20 is drivingly connected by a shaft 32 to the compressor section 18 by a splined connection 33. An intake plenum 34 has an intake opening 36, which utilizes one of the openings 14, formed in the outer case 12 and communicates with the inlet end portion 28 of the compressor section 18. An outlet plenum 38 has a passage 40 operatively positioned between the compressor section 18 and the combustor section 22 for supplying compressed air thereto.

As best shown in FIGS. 1 and 2, the compressor section 18, in this application is an axial compressor but could be a centrifugal compressor without changing the gist of the invention. The rotor 26 extends between the inlet end portion 28 and the outlet end 30 and defines an inner surface 42 and an outer surface 44. Attached to the outer surface 44 is a plurality of blades 48 serially positioned in a plurality of rows formed between the inlet end portion 28 to the outlet end portion 30.

Figure 3:
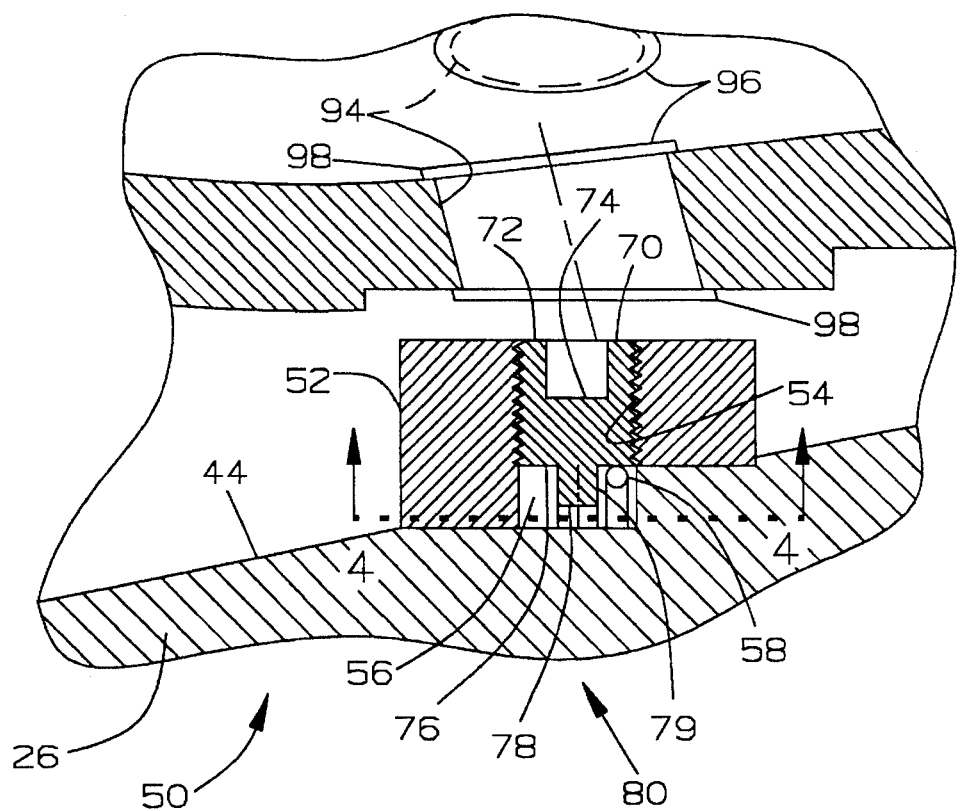
FIG. 3 is an enlarged view taken along line 3 of FIG. 1.
Figure 4:
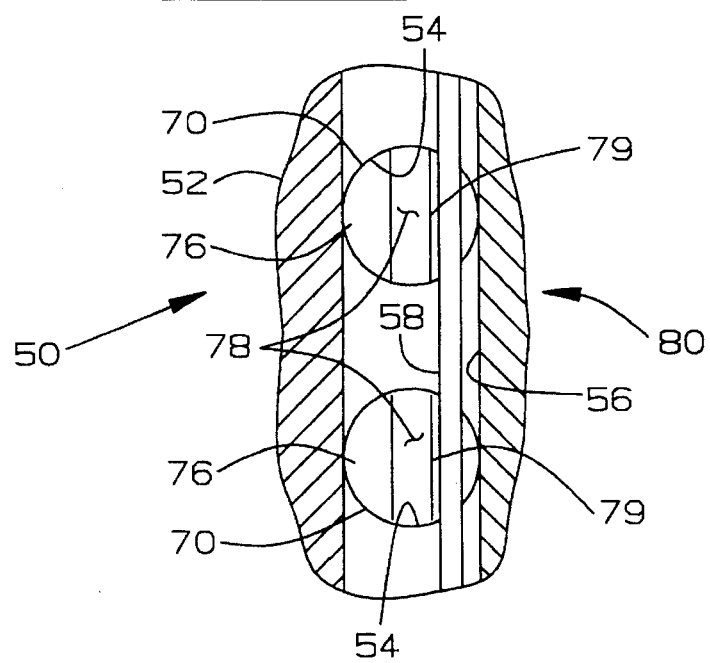
FIG. 4 is an enlarged view taken along line 4—4 of FIG. 3.

As further shown in FIGS. 3 and 4, a means 50 for balancing excessive vibrations includes a band 52 attached to the outer surface 44 of the rotor 26 at a preestablished distance from the inlet end portion 28. The band 52 has a plurality of threaded holes 54 evenly spaced therearound. In this application, the band 52 is press fitted to the outer surface 44 but could be formed integral with the rotor 26. An annular gallery 56 is formed between a portion of the band 52 and the outer surface 44 of the rotor 26. The plurality of threaded holes 54 are radially positioned about and communicate with the annular gallery 56. Positioned in the annular gallery 56 is a spring ring 58 having a preestablished mean diameter and thickness. A portion of the plurality of threaded holes 54 have a plug or balance weight 70 threadedly positioned therein. The plug 70 has a first end 72 defining a tool receiving recess 74 therein, which in this application has a hexagonal configuration. A second end 76 of the plug 70 has a tab 78 defining a flat 79 thereon extending therefrom a preestablished length. As an alternative, the flat 79 of the tab 78 could have a generally rectangular configuration. The generally rectangular configuration would have a preestablished width and thickness. The width would be about 3 times the thickness. The preestablished length of the tab 78 is less than said preestablished depth of the annular gallery 56 by an amount generally equal to or slightly greater than the preestablished thickness of the ring 58. A means 80 for retaining or locking each of the plurality of plugs 70 includes the annular gallery 56, the flat 79 and the ring 58.

A gear 82 is mounted on the outer surface 44 of the rotor 26 near the inlet end portion 28 in a conventional manner. The gear 82 is accessible from the exterior of the case 12 by one of the plurality of openings 14 in the case 12.

The case 12 and the intake plenum 34 includes a wall member 90 extending from the intake opening 36 toward the inlet end portion 28 of the compressor section 18. The wall member 90 defines a flow path 92 having a generally cornucopia configuration having a generally reduced area from the intake opening 36 toward the inlet end portion 28 of the compressor section 18. A pair of holes 94 each having a plug 96 removably positioned therein are defined in the wall member 90 near the inlet end portion 28 of the compressor section 18 and are generally radially aligned with the plurality of threaded holes 54 in the band 52. In this application, the plug 96 has a generally elliptical configuration, a thickness slightly larger than the thickness of the wall member 90, is made of a plastic material and has a flange 98 on each side of the thickness which overlaps the wall member 90. The flow path 92 and the holes 94 establish an access path to the plurality of holes 54. Thus, a means 100 for accessing the annular gallery 56 externally of the engine 10 is provided. The access means 100 includes the intake opening 36, the generally cornucopia configuration between the inlet opening 36 toward the inlet end portion 28 or the flow path 92, the holes 94 and the plugs 96. As an alternative, another existing access path, such as near the turbine section 20, could be provided through the case 12 establishing an access to the plug 70 without changing the essence of the invention. Furthermore, a single large hole or elliptical opening could be used as an alternative to the pair of holes 94 and a cover matching the contour of the opening inserted therein.

A means 110 for rotating the compressor section 18 or the rotating component is provided and includes a rotating tool 112. The rotating tool 112 can be manually actuated such as by turning a crank connected to a conventional gear reduction box 114, electrically actuated or hydraulically actuated. The reduction box 114 includes a plurality of gears 116 of which only the one in driving engagement with the gear 82 is shown. For example, in this application, the rotating tool 112 is attached to the case 12 in a conventional manner and has one of the gears 116 located within the case 12 and in mesh with the gear 82.

The trim balancing system 11 includes the means 100 for accessing the balancing means 50 and the means 50 for balancing. Further included in the trim balancing system 11 is the means 110 for rotating the compressor 18 or one of the rotating components.

Industrial Applicability

In operation, the components making up the gas turbine engine 10 are individually balanced prior to assembly within the engine 10. The means 50 for for balancing vibrations is assembled to the rotor 26 as follows. The rotor 26 is machined so that the band 52 can be pressed thereon. The spring ring 58 is positioned over the rotor 26 and the band 52 with the plurality of evenly spaced threaded holes 54 therein is positioned over the ring 58 and pressed onto the rotor 26. The assembly forms the annular gallery 56 with the ring 58 trapped therein. Upon assembly of the individual components to make up the engine 10 further balancing may be necessary. For example, the turbine section 20 and the compressor section 18 are rotatably positioned in the outer case 12 in drivingly connected relationship. The connection of the compressor section 18 and the turbine section 20, the stack up of tolerance during the manufacturing process and the cantilevered or variability of mounting during the assembly process requires the assembly to be trim balanced. Thus, the trim balancing system 11 is used to increase life, reduce cost and eliminate unwanted inefficiency.

The rotating components 18,20 are externally rotated to a predetermined speed under power of the turbine section 20. After the components have reached the predetermined speed, which in this application is about 15,000 revolutions per minute, the position and amount of any out of balance is determined and recorded. The components 18,20 are brought to a standstill and the means 110 for rotation is connected to the case 12 so that the gear 116 is located inside the case 12 and meshes with the gear 82 connected to the rotor of the compressor section 18.

The means 110 for rotating is engaged and rotates the rotor 26 of the compressor section 18 to the proper position so that balancing weight can be added to the compressor section 18 to overcome the excess vibrations. An operator or mechanic can reach his or her arm into the inlet opening 36 through the flow passage 92 and remove the pair of plugs 96 from the holes 94. After the mechanic removes their arm, the rotating means 110 is actuated and the rotor 26 is rotated slightly until the nearest threaded hole 54 is generally aligned with one of the holes 94 in the wall member 90. Using a flat ended screwdriver, the mechanic positions the flat end of the screwdriver through one of the holes 94 into one of the plurality of threaded holes 54 and compresses the ring 58 against the rotor surface or the bottom of the annular gallery 56. Using an extension attached within the recess 74 of the plug 70, the mechanic positions the plug 70 through the other of the holes 94 and engages the plug 70 with the next adjacent hole 54. After the plug 70 has been secured in the hole 54, the mechanic removes the screwdriver releasing the ring 58 and loosens the plug 70 until the generally rectangular tab 78 is aligned with the ring 58. The spring ring 58 radially moves to a position wherein the ring 58 and the width of the rectangular tab are axially aligned with the annular gallery 56. Thus, the plug 70 is prevented from rotating out of the threaded hole 54. If additional weights are required to overcome the vibration or out of balance the rotating means 110 is engaged until the next progressive threaded hole 54 is generally aligned with the hole 94 in the wall member 90 and the above procedure is repeated until the vibration or out of balance is reduced to an acceptable range. The trim balancing system 11 can also be used for field service and repair if desired.

The trim balancing system 11 is a simple time saving device which allows the assembled components to be trim balanced without removing the rotating components 18,20 from the case 12 or disassembling the case 12. The component parts needed for the trim balancing function are inexpensive to manufacture and assemble. The accessibility to the rotating components for balancing purposes is quick and simple and the trim balancing system 11 is effective in reducing unwanted vibrations to an acceptable level.

We claim:

1. A trim balancing system adapted for use with a mechanism including an outer case having an opening therein and a rotating component, said case being positioned about a rotating component, said rotating component needing to be balanced and defining an inlet end portion, an outlet end portion and an outer surface positioned therebetween; said trim balancing system comprising:

means for balancing excessive vibrations caused by the rotating component, said means for balancing including a band being positioned about the outer surface and having a plurality of threaded holes evenly spaced thereabout and a plurality of balance weights positioned in preestablished ones of the plurality of holes; and means for accessing the balancing means wherein said outer case is in situ, said means including the opening being radially positioned about the plurality of balance weights and aligned therewith.

2. The trim balancing system of claim 1 wherein said means for accessing the balancing means includes a wall member extending from the opening toward the inlet end portion defining a flow path and a hole positioned in the wall member radially aligned within the means for balancing.

3. The trim balancing system of claim 2 wherein said balancing means further includes a means for locking each of the plurality of balance weights in the preestablished ones of the plurality of holes.

4. The trim balancing system of claim 3 wherein said means for locking including an annular gallery formed between the band and the rotor, a tab having a flat thereon extending from each of the balance weights and extending into the annular gallery and a ring positioned in the annular gallery.

5. The trim balancing system of claim 4 wherein said ring has a preestablished thickness, said annular gallery has a preestablished depth and said tab has a preestablished depth which is less than said preestablished depth of the annular gallery by an amount generally equal to the preestablished thickness of the ring.

6. The trim balancing system of claim 2 wherein said accessing means further includes an plug removably positioned in the hole.

7. The trim balancing system of claim 1 further including a means for rotating the rotating component.

8. A trim balancing system adapted for use with a mechanism including an outer case having an opening therein and a rotating component, said case being position about the rotating component, said case further having an inlet end portion; said trim balancing system comprising:

means for balancing excessive vibrations caused by the rotating component; said balancing means includes a band positioned on the rotating component near the inlet end portion having a plurality of holes evenly spaced therearound and a plurality of balance weights positioned in preestablished ones of the plurality of holes; said balancing means further includes a means for locking each of the plurality of balance weights in the preestablished ones of the plurality of holes and an annular gallery formed between the band and the rotor, a tab having a flat thereon extending from each of the balance weights and extending into the annular gallery and a ring positioned in the annular gallery; and means for accessing the balancing means wherein said outer case is in situ; said means for accessing the balancing means includes the opening formed in the outer case, a wall member extending from the opening toward the inlet end portion defining a flow path and a hole positioned in the wall member radially aligned within the means for balancing.

9. The trim balancing system of claim 8 wherein said ring has a preestablished thickness, said annular gallery has a preestablished depth and said tab has a preestablished depth which is less than said preestablished depth of the annular gallery by an amount generally equal to the preestablished thickness of the ring.

10. The trim balancing system of claim 8 further including a means for rotating the rotating component.

* * * * *